June 6, 1939.  A. B. FULLER  2,161,344

INDICATING SYSTEM AND METHOD OF CALIBRATING THE SAME

Filed Feb. 4, 1936

INVENTOR:
Albert B. Fuller,
BY
ATTORNEYS.

Patented June 6, 1939

2,161,344

UNITED STATES PATENT OFFICE 2,161,344

INDICATING SYSTEM AND METHOD OF CALIBRATING THE SAME

Albert B. Fuller, Rochester, N. Y., assignor, by mesne assignments, to Eastman Kodak Company, Jersey City, N. J., a corporation of New Jersey Application February 4, 1936, Serial No. 62,325

8 Claims. (Cl. 200—80)

The present invention relates to an indicating system for facilitating the calibration of a control member which may vary the operating condition of a device.

Known indicating systems are readily susceptible to calibration, but the adjustable elements of such indicating systems cannot be accurately secured in the calibrated position. Nor are the control members of these systems positively maintained in any of the predetermined positions.

The primary object of the present invention is the provision of an indicating system for a control member, which indicating system includes an index member and a scale member carrying a plurality of elements which are adapted to interengage with the index member at any particular setting of the control member or during calibration of the elements.

Another object of the invention is the provision of interengaging scale elements and an index member within an indicating system, such that the scale elements may be rotated with respect to the index member without alteration of the axial displacement between said elements and the index member.

Other and further objects of the invention will be suggested to those skilled in the art by the disclosure which follows.

The above and other objects of the invention are embodied in an indicating system for a control member, which system includes an index member having an engaging part, a scale member which is movable with the control member without change in its axial displacement with respect to the index member, a plurality of graduated elements on the scale member and provided with a part for interengaging with the engaging part on the index member, and a connection between said graduated elements and the scale member for securing each element to said scale member but adapted to be loosened to permit relative movement between said scale member and any of said elements.

Reference is hereby made to the accompanying drawing wherein similar reference characters designate similar elements and wherein.

Figure 1:
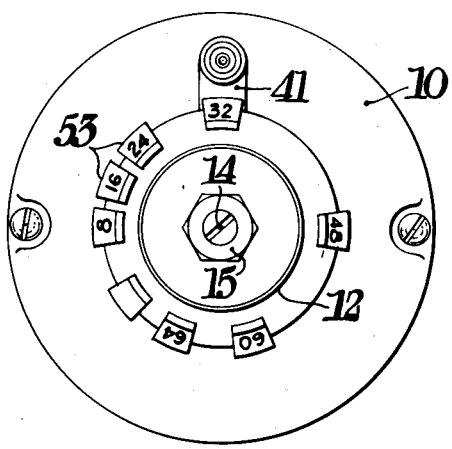
Fig. 1 is an end elevation of the indicating system according to the invention.
Figure 2:
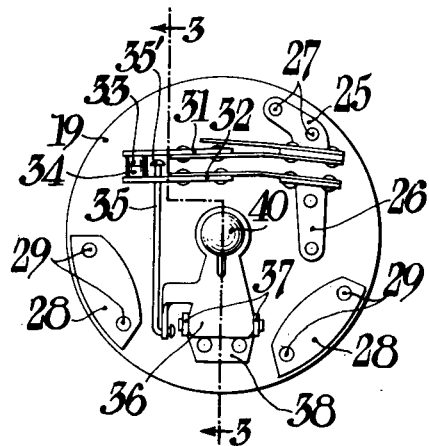
Fig. 2 is an end elevation of an electrical centrifugal governor which the indicating system of the invention may control.
Figure 3:
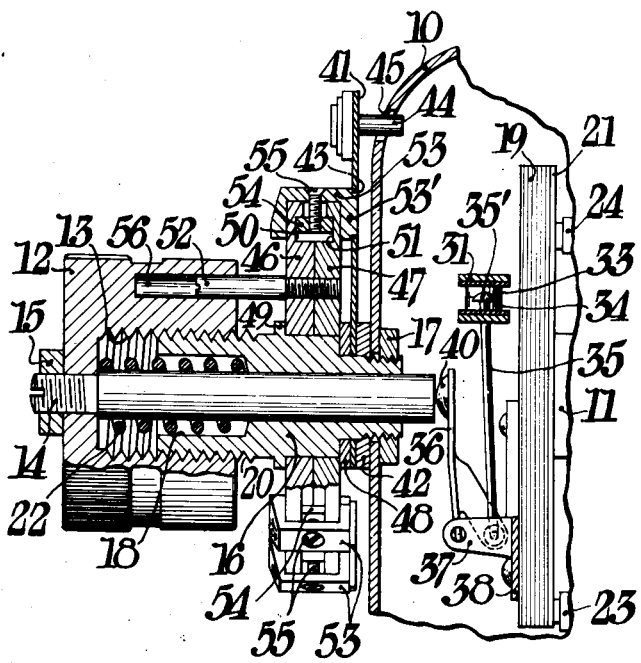
Fig. 3 is a fragmentary cross-section through the indicating system of the invention.

The present invention is to be described in connection with a centrifugal electrical governor or a variable speed electric motor switch of the type described in U. S. Patent No. 1,767,146, issued on June 24, 1930, to Royal Lee. However, it is to be understood that said indicating system of the invention may be applied with equal advantages to other devices which have a variable operating condition.

In order to provide a background for the invention, the details of the electrical centrifugal governor will first be described. Said centrifugal electrical governor is provided upon an electric motor having a housing 10 and a shaft 11. A rotary breaker disk 19 of insulating material is secured to the end of shaft 11 and carries a collector ring 21. A spring-pressed brush 23 bears against collector ring 21, and spring-pressed brush 24 bears against another collector ring, not shown. The outer face of breaker disk 19 carries spaced angle brackets 25 and 26 which are electrically connected to the collector rings, bracket 25 being connected to collector ring 21 by rivets 27. Balancing counterweights 28 are secured to the opposite edges of disk 19 by rivets 29, which also form attaching members for the collector ring 21. A pair of spring members 31 and 32 is respectively attached to brackets 25 and 26 and carry contacts 33 and 34 at their free ends. A stop pin 35 has head 35' which limits the movement of spring member 32 and is controlled by a bell-crank lever 36. The bell-crank 36 is pivotally mounted between the trunnions 37 of a bracket 38 and carries a bearing member 40.

The operation of such an electrical centrifugal governor is well known, but will be briefly described. A portion of the motor circuit passes through spring members 31 and 32 and their contacts 33 and 34. When the contacts are made, the circuit is completed and the speed of the motor increases until the centrifugal forces acting upon spring members 31 and 32 displace these members so that spring member 32 contacts the head 35' of stop pin 35 and spring member 31 continues to move so that the contacts 33 and 34 are broken. Upon interruption of this circuit, the motor slows down. Finally, said contacts 33 and 34 are alternately broken and made to maintain the speed of the motor at any predetermined value, which will be determined by the position of bell-crank lever 36, in turn controlling the location of head 35' of stop pin 35.

The external control member for said governor, or for any other device with a variable operating condition, comprises a knurled knob 12 provided with an internally threaded bore 13 and fastened to a rod 14 by means of a nut 15. Said control member is carried by a support 16 which is fastened to motor housing 10 by means of a nut 17, which is provided with an axial hole through which rod 14 extends, which has a counter-bore 18 and an external threaded portion 20 for engaging the threaded bore 13 of knob 12. A coiled spring 22 encircles rod 14 and fits into the counter-bore 18 of support 16. The rod 14 engages bearing member 40 of the centrifugal governor, and the axial displacement of rod 14 is controlled by rotating knob 12 for axial movement along the threaded portion 20 of the support 16. In other words, the speed setting of the governor is controlled by rotation of the control member.

The indicating means comprises an index member, a scale member, a plurality of elements on the scale member, and a connection between the scale member and each element.

The index member 41 is mounted upon support 16 and spaced from the motor housing 10 by a washer 42. Said index member 41 is provided with a central slot 43 and carries a guide pin 44 which moves within the hole 45 in motor housing 10.

The scale member of the indicating means is composed of a pair of disks 46 and 47 which is rotatably mounted upon support 16 between a collar 48 fitted onto support 16 and a collar 49 which may be integral with support 16. Disks 46 and 47 are provided with respective annular recesses 50 and 51 to form an undercut rim around the periphery of the assembled disks which are held together by a plurality of threaded studs 52. It is obvious that the scale member may be rotated upon support 16 between collars 48 and 49 which prevent any axial movement of said scale member.

A plurality of graduated elements 53 are spaced around the periphery of said scale member. Said elements 53 are each secured to the scale member by a connection which comprises a nut 54 positioned within the undercut peripheral groove formed by annular recesses 50 and 51 and is held against rotation by the side walls of said groove. Said connection also includes a screw 55 which passes through the element 53 and which engages the nut 54.

Another connection is provided between the control member and the scale member so that said scale member is rotated by the control member without receiving any of the axial movement of the control member. Such connection comprises a plurality of holes 56 provided in knurled knob 12 and adapted to receive the threaded studs 52 which are screwed into the disks 46 and 47 of the scale member. Obviously, the rotational movement of the knob 12 or control member will be transmitted through holes 56 and studs 52 to the disks 46 and 47 of the scale member, but the collars 48 and 49 will prevent any axial movement of said disks 46 and 47, although the studs 52 will move in and out of the holes 56 in knob 12.

The advantages of the indicating system of the invention are best understood by a description of its operation. Assuming that a motor of the type illustrated is to be calibrated, the index member 41 is pressed toward the motor housing 10 and the knob 12 is turned until the desired graduated element 53 is in position so that its projection 53' will enter the slot 43 in index member 41. The index member is then released and said projection 53' interengages said slot 43. The screw 55 is then loosened so that element 53 is free to move with respect to the scale member. The control member or knob 12 is turned until the motor is operating at the calibrated speed, preferably a speed corresponding to the graduation upon element 53. It should be noted that such rotation of the control and scale members does not change the location of the graduated element 53 because said element is in interengagement with the index member 41. As soon as the control member is rotated to a position corresponding to the desired or calibrated operating condition of the device, then the screw 55 is tightened and the graduated element 53 is securely fastened to the scale member. Other graduated elements 53 may be brought into interengagement with the index member 41, the screw 55 loosened during calibration of the device and then tightened to secure said element 53 in its calibrated position.

Many variations of the indicating system according to the invention are possible, and the present disclosure is to be construed in an illustrative sense and is to be limited only by the appended claims.

Having now particularly described my invention what I desire to secure by Letters Patent of the United States and what I claim is:

1. In an indicating device adapted for calibration, the combination with a control member which is movable axially and rotatably to vary an operating condition, of an indicating means comprising an index member having an interengaging part, a scale member mounted for rotation only with said control member, a plurality of elements on said scale member and each having a part for inter-engaging said part of said index member in only one relative angular position of each element and said index member, and a connection between the scale member and each of said elements for securing each element to said scale member but adapted to be loosened to permit relative movement between said scale member and any of said elements.

2. An indicating device adapted for calibration of a device, the combination with a control member which is rotated to vary an operating condition of said device, of an indicating means comprising an index member having an interengaging part, a circular scale member rotatable with said control member, a plurality of elements on the periphery of said scale member and each having a part for inter-engaging said part of said index member in only one relative position of each element and said index member.

3. In an adjustable indicating device, the combination with a support, and a control member engaging said support for rotational and axial movement with respect thereto, of an index member having an interengaging part, a scale member mounted for rotation, an element on said scale member for interengaging said part of the index member, and a connection between said control and scale member and for imparting only the rotational movement and not the axial movement of said control member to said scale member.

4. In an adjustable indicating device, the combination with a support, and a control member engaging said support for rotational and axial movement with respect thereto, of an index member having an interengaging part, a scale member mounted for rotation within a plane in a predetermined axial relation to said index member, an element on said scale member for interengagement with said part of the index member only when said predetermined axial relation is maintained between said scale and index member, and a connection between said control and scale members and for imparting only the rotational movement and not the axial movement of said control member to said scale member.

5. In an adjustable indicating device, the combination with a support, and a control member engaging said support for rotational and axial movement with respect thereto, of a resilient index member having an interengaging part which is normally maintained in an engaging position, a scale member mounted for rotation, an element on said scale member for interengagement with said part of the index member in engaging position of said part, and a connection between said control member and said scale member and for imparting only the rotational movement and not the axial movement of said control member to said scale member.

6. In an adjustable indicating device, the combination with a support, and a control member engaging said support for rotational and axial movement with respect thereto, of a resilient index member having an interengaging part which is normally maintained in an engaging position, a scale member mounted for rotation within a plane in a predetermined axial relation to said index member when in engaging position, an element on said scale member for interengagement with said part of the index member only when said predetermined axial relation is maintained between said scale and index member, and a connection between said control and scale member and for imparting only the rotational movement and not the axial movement of said control member to said scale member.

7. In an adjustable indicating device, the combination with a support having a threaded portion, and a control member provided with a threaded bore for engaging the threaded portion of said support and provided with a hole, of a resilient index member on said support and provided with a slot, a scale member mounted for rotation on said support, an element on said scale member and having a projection for engaging the slot in said index member, the resiliency of said index member permitting disengagement of said projection and slot, and a stud on said scale member and extending into the hole in said control member.

8. In an adjustable indicating device, the combination with a support having a threaded portion and a pair of collars, and a control member provided with a threaded bore for engaging the threaded portion of said support and provided with a hole, of a resilient index member on said support and provided with a slot, a scale member mounted for rotation on said support between said collars, an element on said scale member and having a projection for engaging the slot in said index member, the resiliency of said index member permitting disengagement of said projection and said slot, and a stud on said scale member and extending into the hole in said control member to impart only the rotational movement and not the axial movement from said control member to said scale member.

ALBERT B. FULLER.